United States Patent
Kawazu

(10) Patent No.: US 9,805,433 B2
(45) Date of Patent: Oct. 31, 2017

(54) IMAGE PROCESSING APPARATUS AND METHOD THEREFOR

(71) Applicant: CANON KABUSHIKI KAISHA, Tokyo (JP)

(72) Inventor: Ayuta Kawazu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 14/298,151

(22) Filed: Jun. 6, 2014

(65) Prior Publication Data

US 2014/0376812 A1 Dec. 25, 2014

(30) Foreign Application Priority Data

Jun. 25, 2013 (JP) ................. 2013-133097

(51) Int. Cl.
*G06T 1/00* (2006.01)

(52) U.S. Cl.
CPC .... *G06T 1/0028* (2013.01); *G06T 2201/0201* (2013.01)

(58) Field of Classification Search
None
See application file for complete search history.

(56) References Cited

U.S. PATENT DOCUMENTS

2008/0025636 A1* 1/2008 Kotani ............. G06K 9/40
382/276
2013/0223731 A1* 8/2013 Kawazu ........... G06T 1/0028
382/165

OTHER PUBLICATIONS

A Robust Detection algorithm for copy-move forgery in digital images. Yanjun Cao, Tiegang Gao, Li Fan, Qunting Yang. 2011.*
Exposing Digital Forgeries by Detecting Duplicated Image Regions. Alin C Popescu and Hany Farid. 2004.*
Popescu et al., "Exposing Digital Forgeries by Detecting Duplicated Image Regions," TR2004-515, Dartmouth College, Computer Science, pp. 1-11.

* cited by examiner

*Primary Examiner* — Delomia L Gilliard
(74) *Attorney, Agent, or Firm* — Fitzpatrick, Cella, Harper & Scinto

(57) ABSTRACT

An area where development processing is irregular in imaging data are detected as an irregularity area. At least two areas having approximate feature amounts in the imaging data are detected as approximate areas. An altered region in the imaging data is specified from the approximate areas based on the irregularity area and the approximate areas.

16 Claims, 16 Drawing Sheets

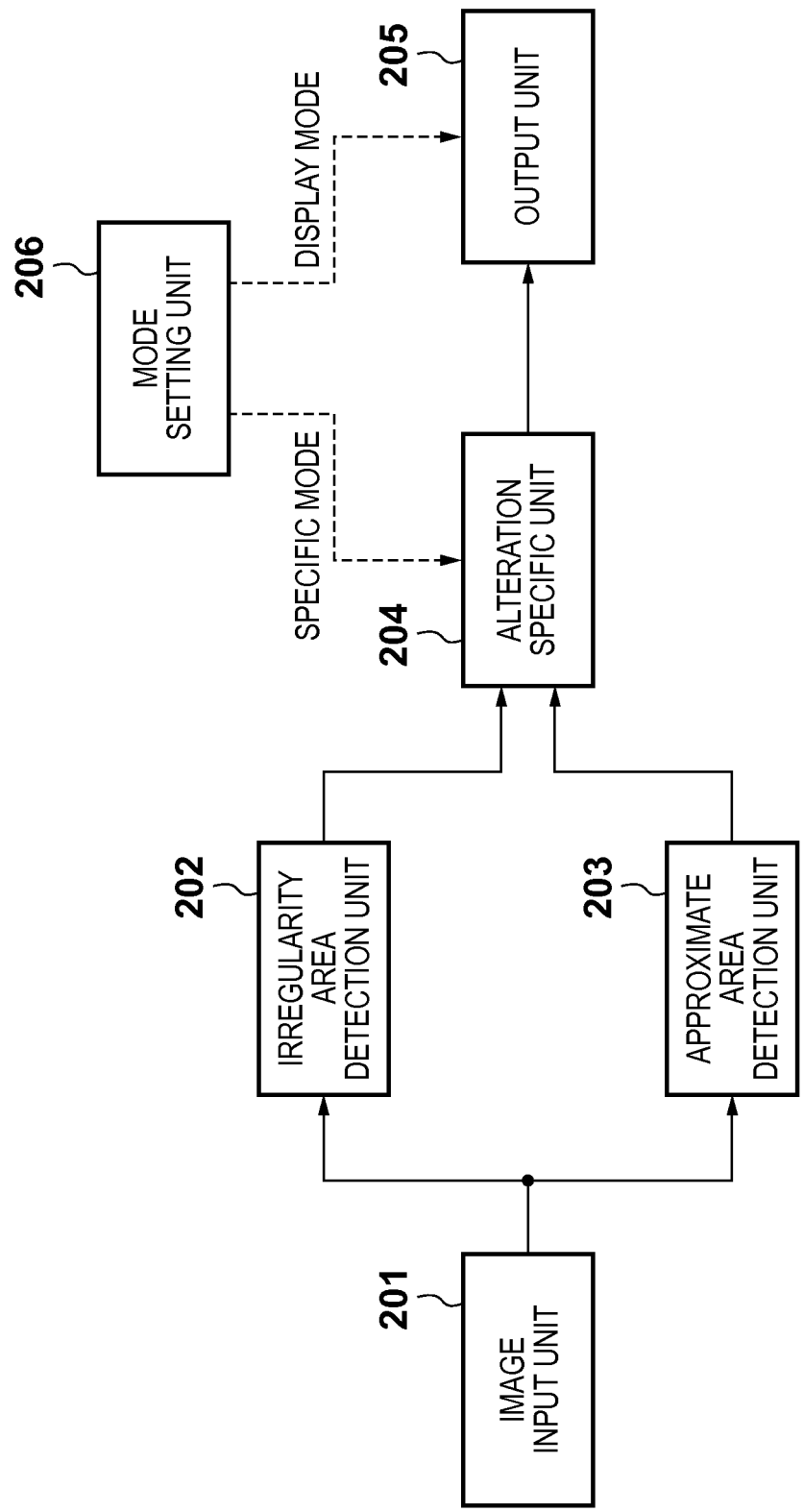

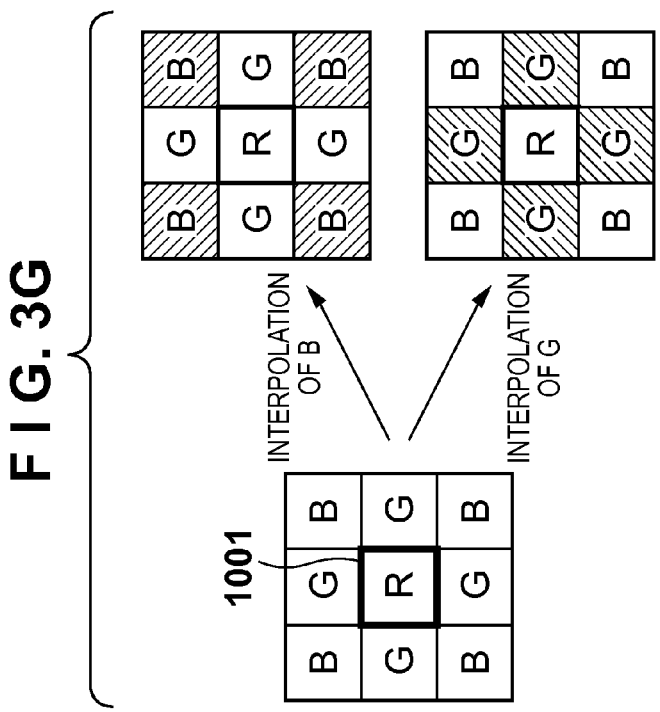

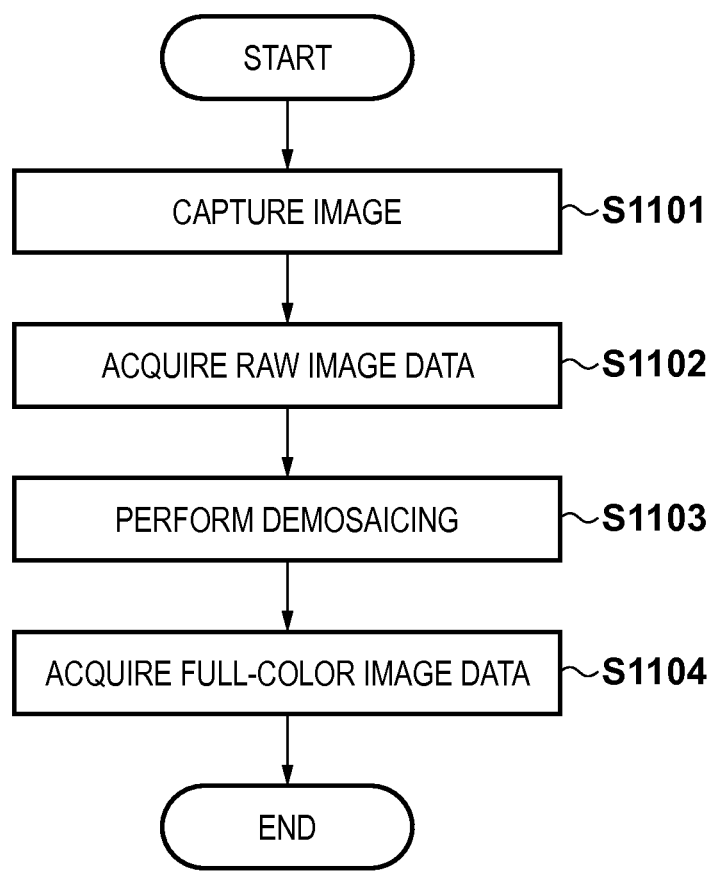

FIG. 5A
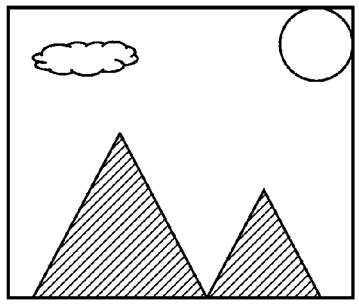 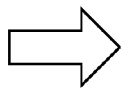
IMAGE DATA
(NO ALTERATION)
CFA PATTERN
FIG. 5B
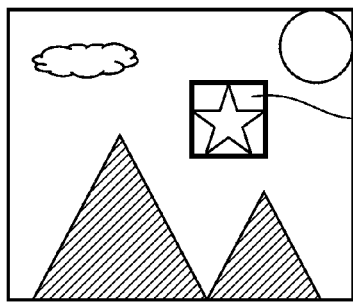 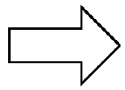
IMAGE DATA
(ALTERATION BY EXTERNAL COPY IS EXISTED)
CFA PATTERN
FIG. 5C
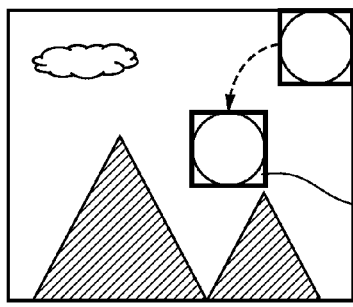 
IMAGE DATA
(ALTERATION BY INTERNAL COPY IS EXISTED)
CFA PATTERN

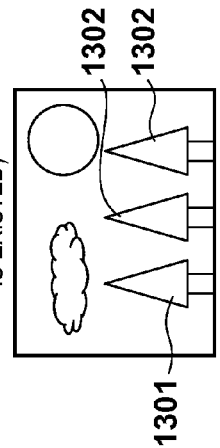
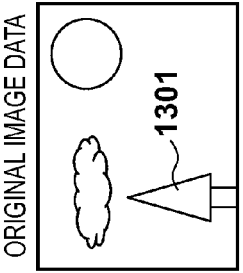
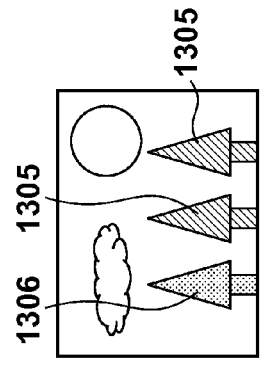
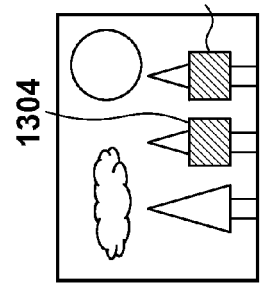
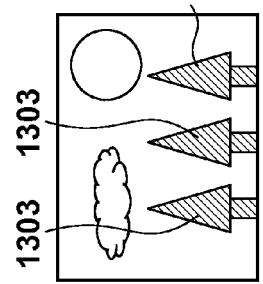
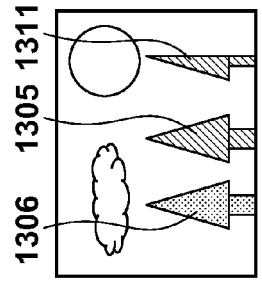
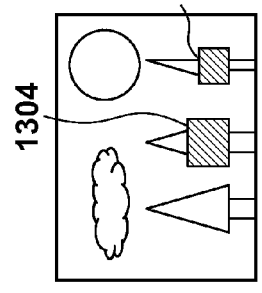
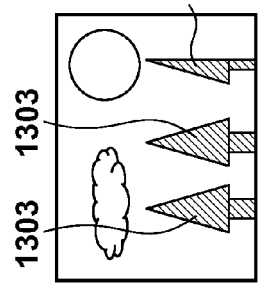
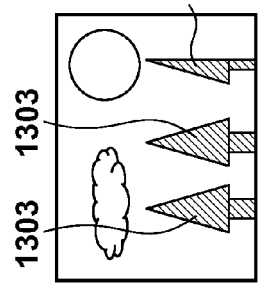

INPUT IMAGE DATA

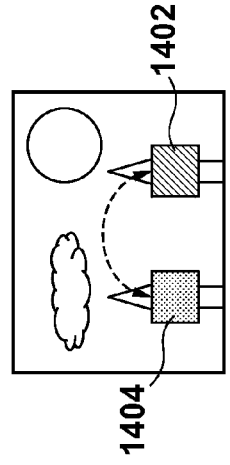
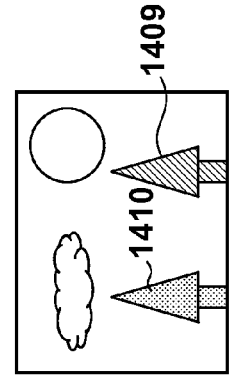
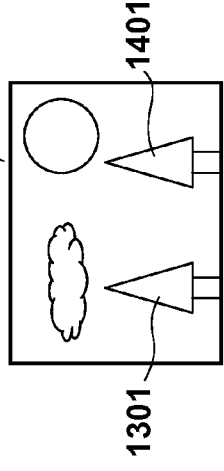
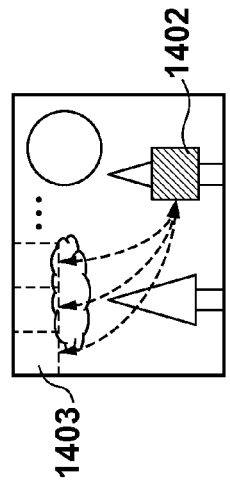
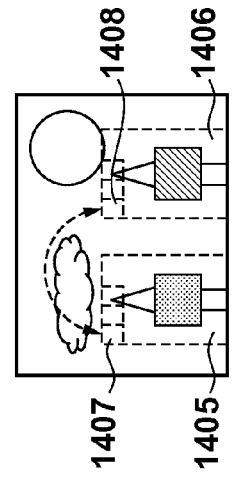
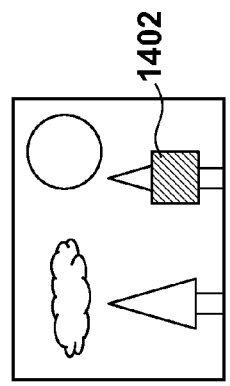
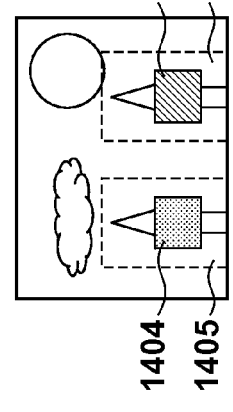

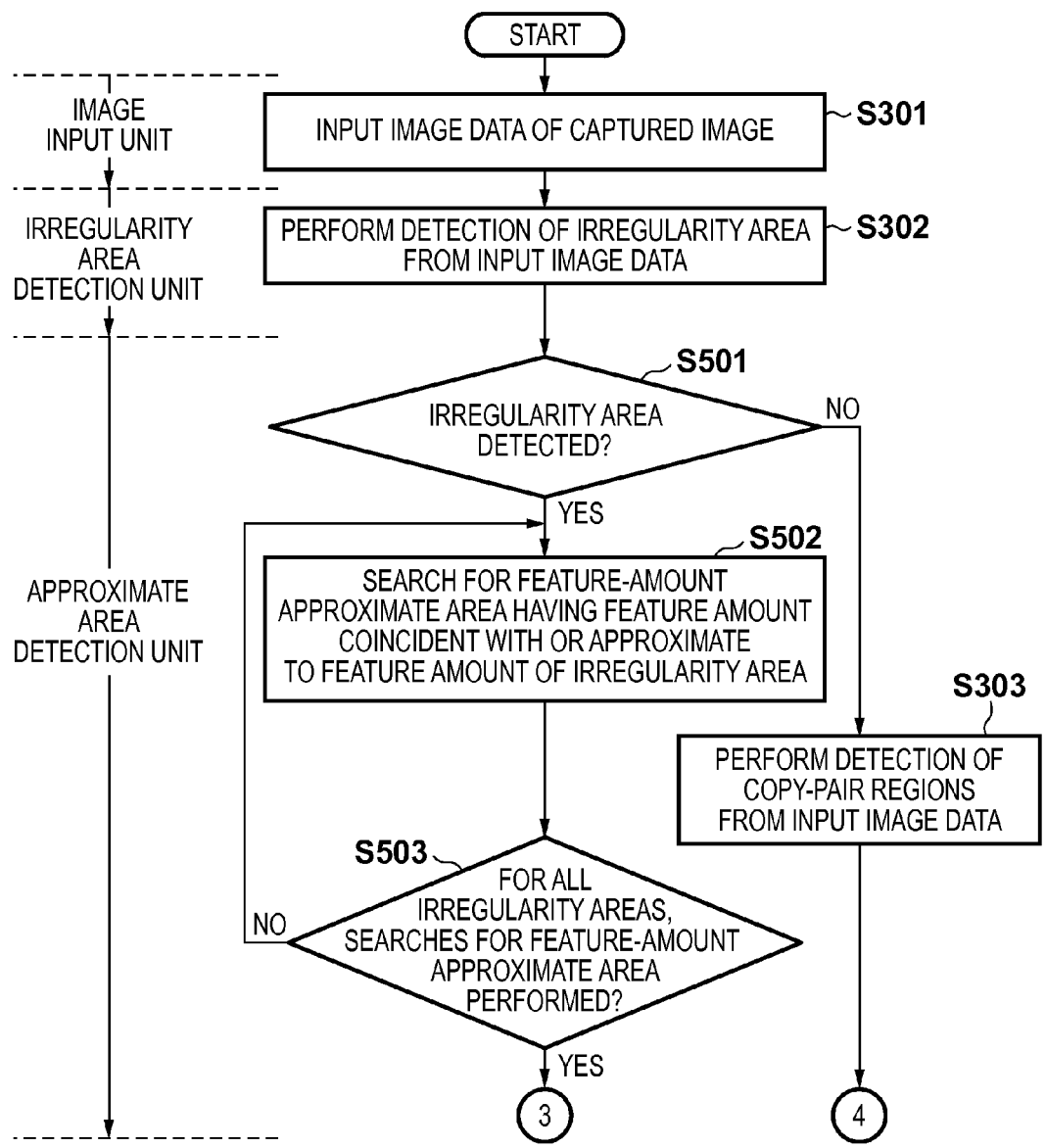
F I G. 12A

IMAGE PROCESSING APPARATUS AND METHOD THEREFOR

BACKGROUND OF THE INVENTION

Field of the Invention

The present invention relates to image processing of detecting an altered region in a captured image.

Description of the Related Art

There is proposed the following technique of detecting alteration of an image captured by a compact digital camera, single-lens reflex digital camera, or the like. This technique detects alteration by analyzing a pattern originally contained in a captured image or comparing the feature amounts of respective regions, without embedding additional information such as a digital watermark in the captured image. Since additional information such as a digital watermark is not embedded, this technique has an advantage capable of detecting alteration without degrading the quality of a captured image or increasing the processing time by embedding of additional information.

Literature 1: Alin C. Popescu, Hany Farid, "Exposing Digital Forgeries by Detecting Duplicated Image Regions," TR2004-515, Dartmouth College, Computer Science.

According to the technique in literature 1, alteration (to be referred to as "internal copy" hereinafter) of copying a partial region of an image to be altered to another region of this image is detected at high accuracy by comparing the feature amounts of respective partial regions.

The technique in literature 1 detects a region altered by internal copy at once for a copy pair of an image region serving as a copy source (to be referred to as a "copy-source region" hereinafter) and an image region serving as a copy destination (to be referred to as a "copy-destination region" hereinafter). However, this technique cannot discriminate the copy-source region and copy-destination region of the copy pair. In other words, this technique cannot specify the copy-destination region which is a true altered region.

SUMMARY OF THE INVENTION

In one aspect, an image processing apparatus comprising: a first detection unit configured to detect, as an irregularity area, an area where development processing is irregular in imaging data; a second detection unit configured to detect, as approximate areas, at least two areas having approximate feature amounts in the imaging data; and a specific unit configured to specify an altered region in the imaging data from the approximate areas based on the irregularity area and the approximate areas.

In another aspect, an image processing apparatus comprising: a first detection unit configured to detect, as an irregularity area, an area where development processing is irregular in imaging data; a second detection unit configured to search the imaging data for a feature-amount approximate area having a feature amount approximate to a feature amount of the irregularity area for each image area of a predetermined size; and a specific unit configured to specify an altered region in the image data based on detection of the feature-amount approximate area. In a case where the feature-amount approximate area is detected, the irregularity area is specified as an altered region in the imaging data, and the feature-amount approximate area is specified as a copy-source region of the altered region.

According to these aspects, a region altered by internal copy can be specified. Also, a copy-source region and copy-destination region in internal copy can be specified. Further, a region altered by external copy can be specified.

Further features of the present invention will become apparent from the following description of exemplary embodiments with reference to the attached drawings.

BRIEF DESCRIPTION OF THE DRAWINGS

FIG. 2 is a block diagram for explaining the functional arrangement of the image processing apparatus according to the embodiment.

FIGS. 3A to 3G are views showing examples of a CFA.

FIG. 4 is a flowchart for explaining processing by a digital camera in capturing.

FIGS. 5A to 5C are views for explaining irregularity area detection processing by an irregularity area detection unit.

FIGS. 6A to 6I are views for explaining detection of an irregularity area.

FIGS. 11A to 11H are views for explaining an example of alteration detection in the second modification.

FIGS. 12A and 12B are flowcharts for explaining alteration detection processing in the second modification.

DESCRIPTION OF THE EMBODIMENTS

Image processing according to an embodiment of the present invention will now be described in detail with reference to the accompanying drawings.

[Apparatus Arrangement]

Figure 1:
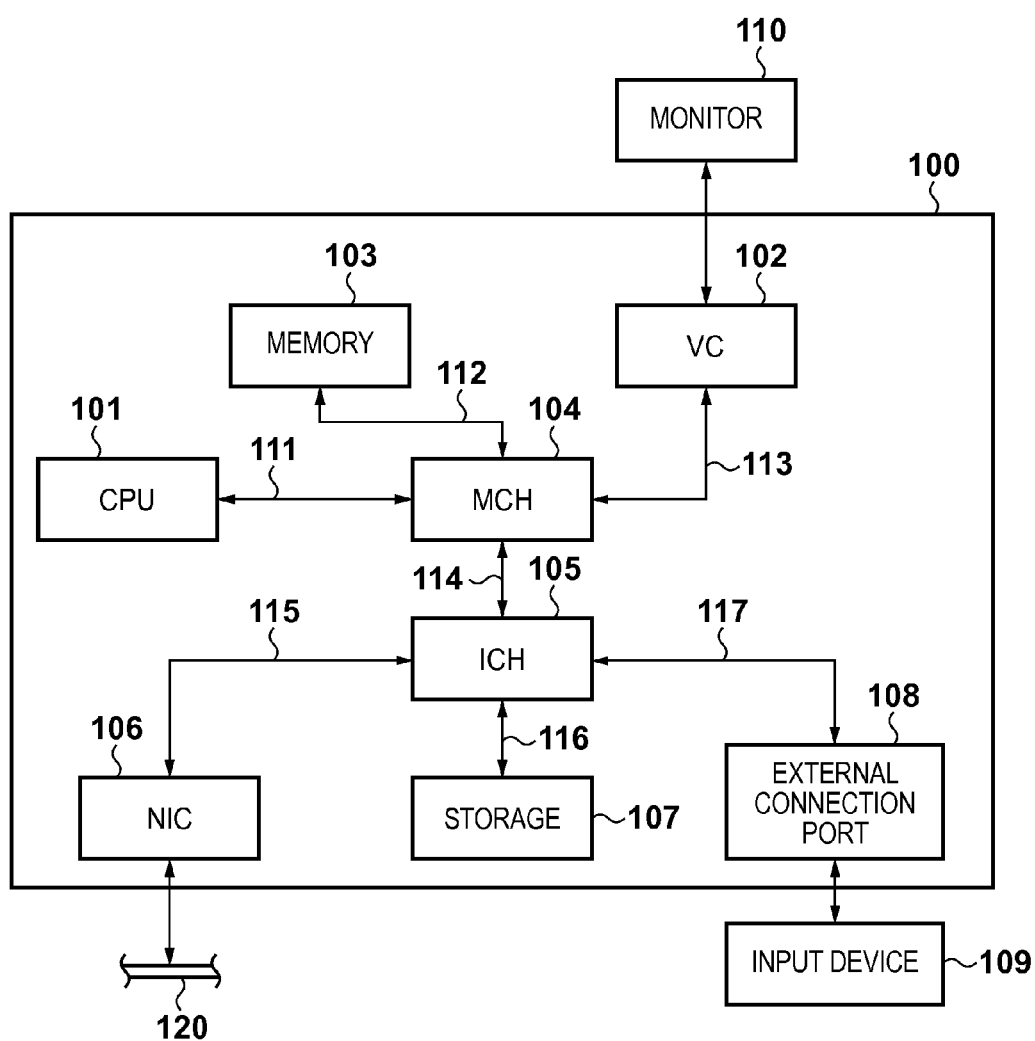
FIG. 1 is a block diagram showing the arrangement of an information processing apparatus functioning as an image processing apparatus according to an embodiment.

The arrangement of an information processing apparatus functioning as an image processing apparatus 100 according to the embodiment is shown in the block diagram of FIG. 1.

A microprocessor (CPU) 101 controls the overall or partial operation of the image processing apparatus 100 using a memory 103 as a work memory, and executing a program stored in a recording medium such as the memory 103 or a storage 107. Note that the storage 107 comprises a hard disk drive (HDD) or solid state drive (SSD), and the memory 103 comprises a random access memory (RAM) and a read only memory (ROM). In accordance with an instruction from the CPU 101, a video controller (VC) 102 performs control to display a screen constituted by an image, text, and the like on a monitor 110.

A memory controller hub (MCH) 104 is a so-called "north bridge" which controls data transfer between the CPU 101, the VC 102, the memory 103, and an input/output controller hub (ICH) 105 through links 111 to 114. The ICH 105 is a so-called "south bridge" which controls data transfer between a network interface card (NIC) 106, the storage 107, and an external connection port 108 through links 115 to 117. Note that each of the links 111 to 117 is, for example, a parallel bus such as PCI (Peripheral Component Interconnect), or a serial bus such as PCI Express®, Serial ATA or USB (Universal Serial Bus).

The NIC 106 is a communication interface for connecting the image processing apparatus 100 to a wired or wireless network 120. The storage 107 stores an operating system (OS) and various programs to be executed by the CPU 101, various data, and the like. The external connection port 108 is a serial bus port such as USB or IEEE1394 for connecting an external device to the image processing apparatus 100. By connecting an input device 109 to the external connection port 108, the image processing apparatus 100 can acquire data from the input device 109. Note that the input device 109 is a device which inputs data to the image processing apparatus 100 through the external connection port 108. Examples of the input device 109 are a keyboard, a pointing device such as a mouse, an image capturing apparatus such as a digital camera, image input apparatus such as an image scanner, and a data input/output apparatus such as a memory card reader/writer. When a High-Definition Multimedia Interface (HDMI®) port or DisplayPort™ is prepared as the external connection port 108, the monitor 110 can be connected to the external connection port 108.

The image processing apparatus 100 according to the embodiment is implemented by supplying, to the information processing apparatus serving as a computer device such as a personal computer, a tablet computer, a smartphone or the like, a program for executing processing to be described later.

[Functional Arrangement]

The functional arrangement of the image processing apparatus according to the embodiment will be described with reference to the block diagram of FIG. 2. This functional arrangement is implemented by executing, by the CPU 101, a program for implementing functions to be described later.

An image input unit 201 receives image data from the input device 109 through the external connection port 108, and stores the input image data in a predetermined area such as the memory 103 or storage 107. The input image data is image data (imaging data) representing an image captured by a digital camera. The data format of the input image data is, for example, JPEG (Joint Photographic Experts Group), TIFF (Tagged Image File Format), or RAW.

An irregularity area detection unit 202 serving as the first detection unit detects, from input image data for each first unit image area, an area (to be referred to as an "irregularity area" hereinafter) where development processing has been irregularly performed. For example, the irregularity area detection unit 202 estimates, from input image data, the color filter array (CFA) pattern of the image sensor of a digital camera used for capturing. Then, the irregularity area detection unit 202 analyzes the CFA pattern and detects, as an irregularity area, an area where the CFA pattern is irregular.

An approximate area detection unit 203 serving as the second detection unit extracts, for each second unit image area, the feature amount of an image represented by input image data, and detects at least two unit image areas having coincident or approximate feature amounts. That is, at least two unit image areas having coincident or approximate feature amounts are detected as a pair of areas which are contained in input image data and obtained by internal copy. The detected pair of areas will be called "copy-pair regions" or "approximate areas".

An alteration specific unit 204 specifies a copy-destination region serving as a true altered region based on the irregularity area detected by the irregularity area detection unit 202 and the copy-pair regions detected by the approximate area detection unit 203.

An output unit 205 outputs, for example, to the monitor 110, information for distinctively visualizing and displaying an altered region (copy-destination region) specified by the alteration specific unit 204 or the like. For example, the output unit 205 superimposes and displays, on an image represented by input image data, a rectangular frame representing the second unit image area constituting an altered region specified by the alteration specific unit 204, the outline of this area, or the like. When neither altered region nor possibly altered region is detected, the output unit 205 can also display a no-detection message on the monitor 110.

A mode setting unit 206 receives, as a user instruction, a specific mode (or display mode) which designates the type of region to be specified (or displayed) as an altered region. Then, the mode setting unit 206 sets the designated specific mode (or display mode) in the alteration specific unit 204 (or output unit 205). Note that details of an operation of the alteration specific unit 204 (or output unit 205) that corresponds to the specific mode (or display mode) will be explained in the first modification.

[Irregularity Area Detection Unit]

CFA Pattern

The CFA is, for example, the RGB color filter array of an image sensor, and represents the RGB light receiving pattern of the light receiving elements (units corresponding to pixels in an image) of the image sensor. Many commercially available image sensors adopt an arrangement in which each light receiving element receives color information of one of R, G, and B for cost reduction. Such an image sensor acquires color information from incident light by using a CFA typified by a Bayer array in order to efficiently acquire color information.

The unit of the CFA is a square array of, for example, 2×2 cells, and CFAs are arranged regularly and periodically on the image sensor. FIGS. 3A to 3G show examples of the CFA. FIGS. 3A to 3D show Bayer arrays. FIG. 3E shows a CFA in which emerald green E is arranged in one of two cells of green G in the Bayer array. For example, as shown in FIG. 3F, CFAs are arranged regularly and periodically on the image sensor.

Processing by a digital camera in capturing will be explained with reference to the flowchart of FIG. 4.

The optical image of an object is photoelectrically converted into a digital signal by imaging (S1101), and the digital signal is acquired as RAW image data (S1102). Color information of the RAW image data depends on the CFA pattern of the image sensor. For the CFA shown in FIG. 3A, color information of each pixel of the RAW image data is shown in FIG. 3F.

As described above, each pixel of RAW image data has only one piece of color information, so RGB color information needs to be given to each pixel (full colorization). To give RGB color information to each pixel, absent color components are interpolated from neighboring pixels (S1103). For example, a pixel 1001 of interest shown in FIG. 3G has only the R component, so the absent B component is interpolated from four neighboring B pixels and the absent G component is interpolated from four neighboring G pixels. By performing development processing including this interpolation processing, full-color image data is acquired from the RAW image data (S1104).

This color component interpolation processing is called "demosaicing." A color interpolation algorithm used in interpolation processing is called a "demosaicing algorithm (DMA)." The DMA has one-to-one correspondence with a camera model, image sensor, or the like. DMA types are bilinear interpolation, nearest neighbor interpolation, and AHD (Adaptive Homogeneity-Directed) interpolation.

To detect an irregularity area, the irregularity area detection unit 202 estimates, for example, from input image data, the CFA pattern of the digital camera used in capturing, and specifies an area where the CFA pattern is irregular. When input image data is RAW image data, the pattern of pieces of color information of respective pixels is directly the CFA pattern. To the contrary, when input image data is full-color image data, each pixel has all the color components and thus the CFA pattern needs to be estimated.

CFA Pattern Estimation Method

The CFA pattern is estimated for each first unit image area (to be referred to as an "estimation area" hereinafter). The estimation area is a rectangular area of A×B pixels and is formed from, for example, 64×64 pixels for A=B=64. If the estimation area is small, a CFA pattern estimation error may occur. Thus, the estimation area is desirably as large as possible.

For each estimation area, the irregularity area detection unit 202 estimates a Bayer array equivalent to the CFA pattern of full-color image data, out of the four Bayer arrays shown in FIGS. 3A to 3D. More specifically, simple linear interpolation operations such as bilinear interpolation operations complying with the four Bayer arrays are performed on a full-color image in the estimation area (to be referred to as "re-demosaicing" hereinafter). Then, the least-squares errors of the G component between the four image data of the estimation area after re-demosaicing and the original full-color image data are calculated. The Bayer array of image data having a smallest least-squares error that was used for re-demosaicing is determined to be the CFA pattern of the estimation area of interest. By performing this processing on the entire input image data, the CFA pattern of the input image data is estimated.

Note that the above-described CFA pattern estimation method is merely an example. Another estimation method is a method using Exif (Exchangeable image file format) information serving as well-known metadata. More specifically, a CFA pattern contained in Exif information of input image data is used as the true CFA pattern of input image data, the input image data undergoes re-demosaicing, and pixel values between the image data after re-demosaicing and the input image data are compared. By this comparison, an area having a CFA pattern different from the true CFA pattern can be specified. When a DMA used in color interpolation at the time of development of input image data is known, an area having a different CFA pattern can be detected at higher accuracy by performing re-demosaicing using this DMA.

Detection of Irregularity Area

Irregularity area detection processing by the irregularity area detection unit 202 will be described with reference to FIGS. 5A to 5C.

First, an example in which alteration (to be referred to as "external copy" hereinafter) of copying a partial region of another image to an image to undergo alteration detection is detected from input image data will be explained.

For example, assume that the CFA pattern of image data shown in FIG. 5A is a Bayer array shown in FIG. 5A. At this time, when alteration by external copy from another image having a CFA pattern shown in FIG. 5C has been performed on input image data, as shown in FIG. 5B, only a CFA pattern 1202 of an external copy region 1201 differs from the surroundings. That is, the irregularity area detection unit 202 detects, as an irregularity area, the region 1201 having a CFA pattern different from the surroundings, and determines that the region 1201 is an altered region.

An example in which alteration by internal copy will be explained next.

For example, when alteration by internal copy of a partial region 1203 to another region 1204 of the image has been performed on input image data, as shown in FIG. 5C, only a CFA pattern 1206 of the region 1204 sometimes becomes different from the surroundings. That is, if a CFA pattern 1205 of the copy-source region 1203 and the original CFA pattern of the copy-destination region 1204 differ from each other in internal copy, the CFA pattern 1206 of the copy-destination region 1204 changes (disturbs) the periodicity of surrounding CFA patterns. The irregularity area detection unit 202 detects, as an irregularity area, the region 1204 where the periodicity of the CFA pattern is changed (disturbed), and determines that the region 1204 is an altered region.

Note that the irregularity area detection unit 202 stores, as a detection result in a predetermined area such as the memory 103, the upper left pixel coordinates of the estimation area and the size of the estimation area.

Detection of an irregularity area will be explained with reference to FIGS. 6A to 6I. Assume that FIG. 6A shows original image data, and FIG. 6B shows altered image data having regions 1302 in each of which a partial region 1301 is copied by internal copy. When the altered image data shown in FIG. 6B is input, the irregularity area detection unit 202 detects regions 1304 hatched in FIG. 6D as irregularity areas.

Note that the irregularity area detection unit 202 cannot determine whether a detected irregularity area is generated by internal copy or external copy. The irregularity area detection unit 202 is lower in the detection accuracy of alteration by internal copy than the approximate area detection unit 203. For example, the irregularity area detection unit 202 can only detect the rough positions of altered regions, as represented by the regions 1304 shown in FIG. 6D.

The irregularity area detection unit 202 can detect, as irregularity areas, not only a region having a different CFA pattern, but also a region having a different DMA in development and a region having different pixels (reference pixels) used in color interpolation at the time of demosaicing.

[Approximate Area Detection Unit]

Figure 7:
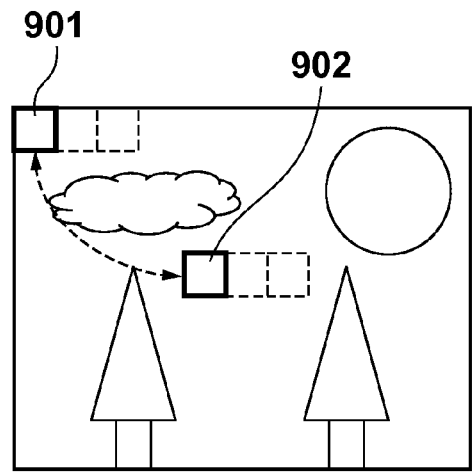
FIG. 7 is a view for explaining detection of copy-pair regions generated by internal copy.

Detection of copy-pair regions generated by internal copy will be explained with reference to FIG. 7.

By using, for example, principal component analysis, the approximate area detection unit 203 extracts the feature amount of a block 901 of interest equivalent to the second unit image area (to be referred to as a "feature-amount extraction area" hereinafter) of input image data shown in FIG. 7, and the feature amount of another block (comparison block) 902 equivalent to a feature-amount extraction area. The approximate area detection unit 203 compares the feature amounts of these two blocks, and if they coincide with each other (or the difference between them is equal to or smaller than a predetermined threshold), determines that the block 901 of interest and the comparison block 902 are copy-pair regions generated by internal copy.

The feature-amount extraction area is a rectangular area of X×Y pixels. For example, when X=4 and Y=4, the feature-amount extraction area is formed from 4×4 pixels. When an image represented by input image data is formed from 512×512 pixels, the feature amounts of a total of 128 blocks are extracted from the entire input image data.

As for extraction of the feature amount, an image may be divided so that feature-amount extraction areas do not overlap each other. Alternatively, an image may be divided so that feature-amount extraction areas are moved horizontally or vertically by, for example, one pixel. When the image is formed from 512×512 pixels and the feature-amount extraction area is formed from 4×4 pixels, feature-amount extraction areas are moved a total of (512−4) times horizontally by one pixel and a total of (512−4) times vertically by one pixel. As a result, the feature amounts of a total of 509×509 blocks can be extracted from the entire image.

The approximate area detection unit 203 stores, as a detection result in a predetermined area such as the memory 103, the upper left pixel coordinates of copy-pair regions and the sizes of feature-amount extraction areas.

Note that the approximate area detection unit 203 cannot discriminate a copy-source block (copy-source region) and copy-destination block (copy-destination region) out of copy-pair regions. For example, assume that FIG. 6A shows original image data, FIG. 6B shows altered image data having the regions 1302 in each of which the partial region 1301 is copied by internal copy, and the altered image data is input, similar to the description of the irregularity area detection unit 202. The approximate area detection unit 203 detects regions 1303 hatched in FIG. 6C as copy-pair regions.

The approximate area detection unit 203 can also detect a region 1308 where part of the partial region 1301 is copied by internal copy, as shown in FIG. 6F. The detection result of the region 1308 is a region 1309 hatched in FIG. 6G.

The approximate area detection unit 203 detects a pair of areas having approximate feature amounts, as described above, and thus can also detect even alteration of processing a copy-destination region after internal copy. For example, the approximate area detection unit 203 can detect alteration of copying a partial region by internal copy and blurring the boundary region of the copy-destination region, because the feature amounts of the copy-source region and copy-destination region are approximate to each other.

[Alteration Specific Unit]

Processing by the alteration specific unit 204 will be explained with reference to FIGS. 6A to 6I. As in the above description, assume that FIG. 6A shows original image data, and FIG. 6B shows input image data altered by internal copy. Also, assume that the approximate area detection unit 203 detects the copy-pair regions 1303 shown in FIG. 6C from the image data in FIG. 6B, and the irregularity area detection unit 202 detects the irregularity areas 1304 shown in FIG. 6D.

As shown in FIG. 6E, the alteration specific unit 204 specifies, as true altered regions 1305 generated by internal copy, regions in each of which the copy-pair region 1303 and the irregularity area 1304 overlap each other. More specifically, based on the coordinates and size of an estimation area detected as the irregularity area 1304, and the coordinates of the feature-amount extraction area detected as the copy-pair region 1303, the alteration specific unit 204 determines whether the copy-pair region 1303 and irregularity area 1304 overlap each other.

For example, assume that the upper left pixel of an image is defined as the origin (X, Y)=(0, 0), the coordinates of a feature-amount extraction area of 4×4 pixels in the copy-pair region 1303 is (100, 100), and an estimation area of 64×64 pixels is used to detect an irregularity area. In this case, if the detected irregularity area 1304 contains an estimation area of 37≤X≤103 and 37≤Y≤103, it is determined that the copy-pair region 1303 and irregularity area 1304 overlap each other.

The alteration specific unit 204 specifies, as a copy-source region with respect to the copy-destination region, a region which forms copy-pair regions together with the specified altered region (copy-destination region) 1305. For example, in FIG. 6E, the alteration specific unit 204 specifies, as a copy-source region, a region 1306 which forms copy-pair regions together with the specified altered region 1305. Further, the alteration specific unit 204 specifies, as a region altered by external copy, the irregularity area 1304 not specified as a copy-destination region.

Even when input image data contains the region 1308 where part of the partial region 1301 is copied by internal copy, as shown in FIG. 6F, the alteration specific unit 204 can similarly specify a true altered region (copy-destination region) by internal copy. In this case, the approximate area detection unit 203 detects the copy-pair regions 1303 and 1309 shown in FIG. 6G from the image data shown in FIG. 6F. The irregularity area detection unit 202 detects the irregularity area 1304 and an irregularity area 1310 shown in FIG. 6H. As shown in FIG. 6I, the alteration specific unit 204 specifies, as altered regions (copy-destination regions), the region 1305 where the copy-pair region 1303 and irregularity area 1304 overlap each other, and a region 1311 where the copy-pair region 1309 and irregularity area 1310 overlap each other. Further, the alteration specific unit 204 specifies, as a copy-source region, the region 1306 paired with the copy-pair regions 1303 and 1309.

Even upon alteration of processing a copy-destination region after internal copy, the approximate area detection unit 203 can detect a pair of areas having approximate feature amounts, and the alteration specific unit 204 can specify a true altered region (copy-destination region), as in the above description.

For each of a copy-destination region, a copy-source region, and a region altered by external copy, the alteration specific unit 204 stores, as an altered region specifying result in a predetermined area such as the memory 103, the upper left pixel coordinates of a feature-amount extraction area contained in each of these regions, and the size of the feature-amount extraction area.

[Output Unit]

An output example of an alteration detection result will be explained with reference to FIGS. 8A and 8B.

Figure 8A:
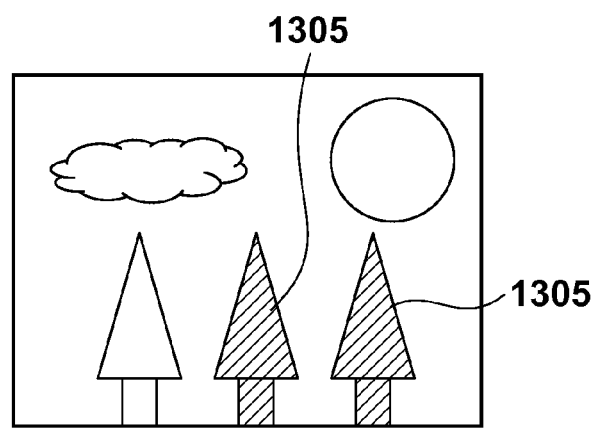
FIGS. 8A and 8B are views for explaining an output example of an alteration detection result.

As shown in FIG. 8A, the output unit 205 visualizes the altered regions (copy-destination regions) 1305 specified by the alteration specific unit 204, and displays them on, for example, the monitor 110.

When no altered region is specified, detected irregularity areas and copy-pair regions may be displayed distinctively. For example, the copy-pair regions and irregularity areas can be distinctively displayed by displaying them in different colors such that the copy-pair regions are displayed in red and the irregularity areas are displayed in blue.

Figure 8B:
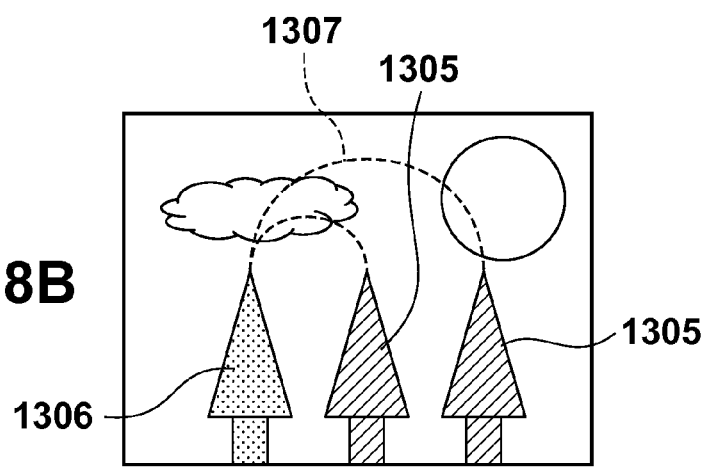

The copy-destination regions 1305 and copy-source region 1306 can also be displayed distinctively, as shown in FIG. 8B. At this time, for example, broken lines 1307 may be displayed to connect the copy-destination regions 1305 and copy-source region 1306 in order to clarify the copy source region 1306 as the copy source of the copy-destination regions 1305.

Further, a region altered by external copy may be displayed in a color different from a region altered by internal copy so that the region altered by external copy and the region altered by internal copy can be distinctively displayed.

[Alteration Detection Processing]

Figure 9:
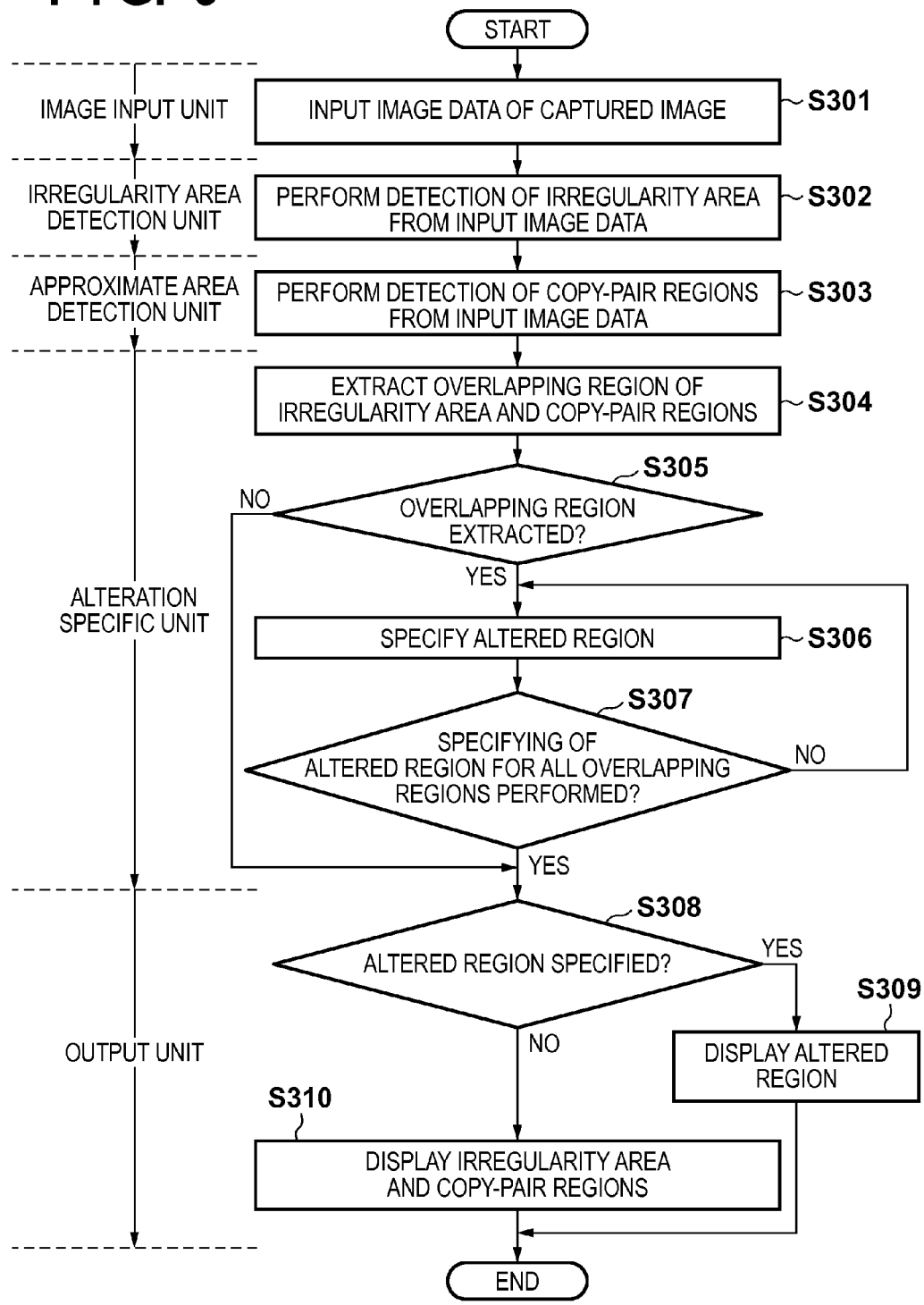
FIG. 9 is a flowchart for explaining alteration detection processing according to the embodiment.

Alteration detection processing according to the embodiment will be described with reference to the flowchart of FIG. 9.

The image input unit 201 receives image data of a captured image from the input device 109 (S301). The irregularity area detection unit 202 performs detection of irregularity area from the input image data (S302). The approximate area detection unit 203 performs detection of copy-pair region from the input image data (S303). Note that copy-pair regions had been generated by internal copy, and steps S302 and S303 are in no particular order. For example, step S302 may be executed after step S303. When the CPU 101 is a multicore processor having two or more CPU cores, steps S302 and S303 may be parallelly processed.

Then, the alteration specific unit 204 extracts the overlapping region of the detected irregularity area and detected copy-pair regions (S304), and determines whether the overlapping region has been extracted (S305). If no overlapping region has been extracted, the process advances to step S308.

If the overlapping region has been extracted, the alteration specific unit 204 specifies an altered region according to the above-described procedures (S306). More specifically, a copy-destination region serving as a true altered region is specified. If, for example, there is a user request, a copy-source region and a region altered by external copy are specified. The alteration specific unit 204 repeats the processing in step S306 until it is determined in step S307 that the specifying of altered regions for all overlapping regions has been performed.

After that, the output unit 205 determines whether an altered region has been specified (S308). If an altered region has been specified, the output unit 205 displays, by the above-described method, the altered region specified by the alteration specific unit 204 (S309). If no altered region has been specified, the output unit 205 displays the irregularity area and copy-pair regions by the above-mentioned method (S310). When no overlapping region has been extracted, specification of an altered region is not performed, and the output unit 205 executes the processing in step S310.

In this manner, a copy-destination region and copy-source region can be detected using both an irregularity area each detected from a change (disturbance) of the periodicity of the CFA pattern, and copy-pair regions which are generated by internal copy and detected from the coincidence or approximation between feature amounts. That is, a copy-destination region serving as a true altered region can be detected at high accuracy.

First Modification

In the above description, the processing in step S306 is "If, for example, there is a user request, a copy-source region and a region altered by external copy are specified." This will be explained in more detail below.

Figure 10A:
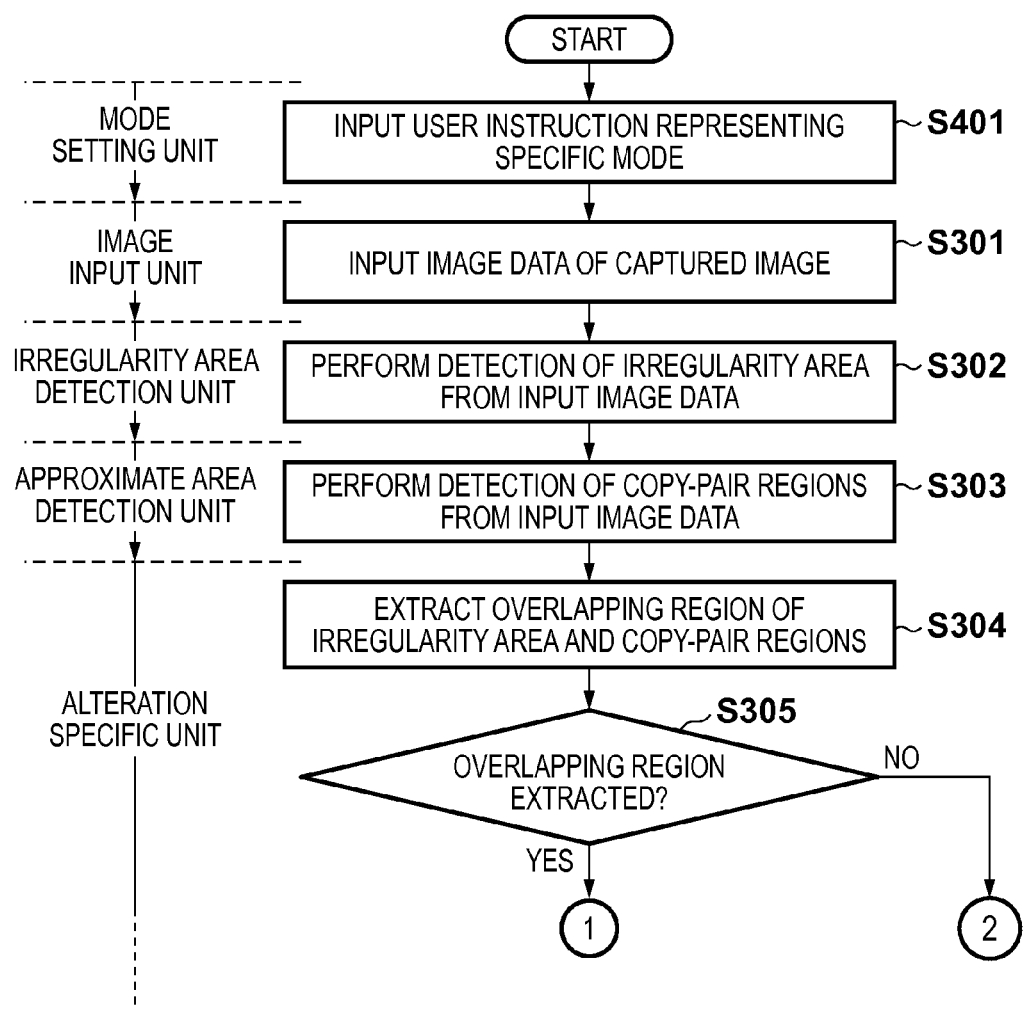
FIGS. 10A and 10B are flowcharts for explaining alteration detection processing in the first modification.
Figure 10B:
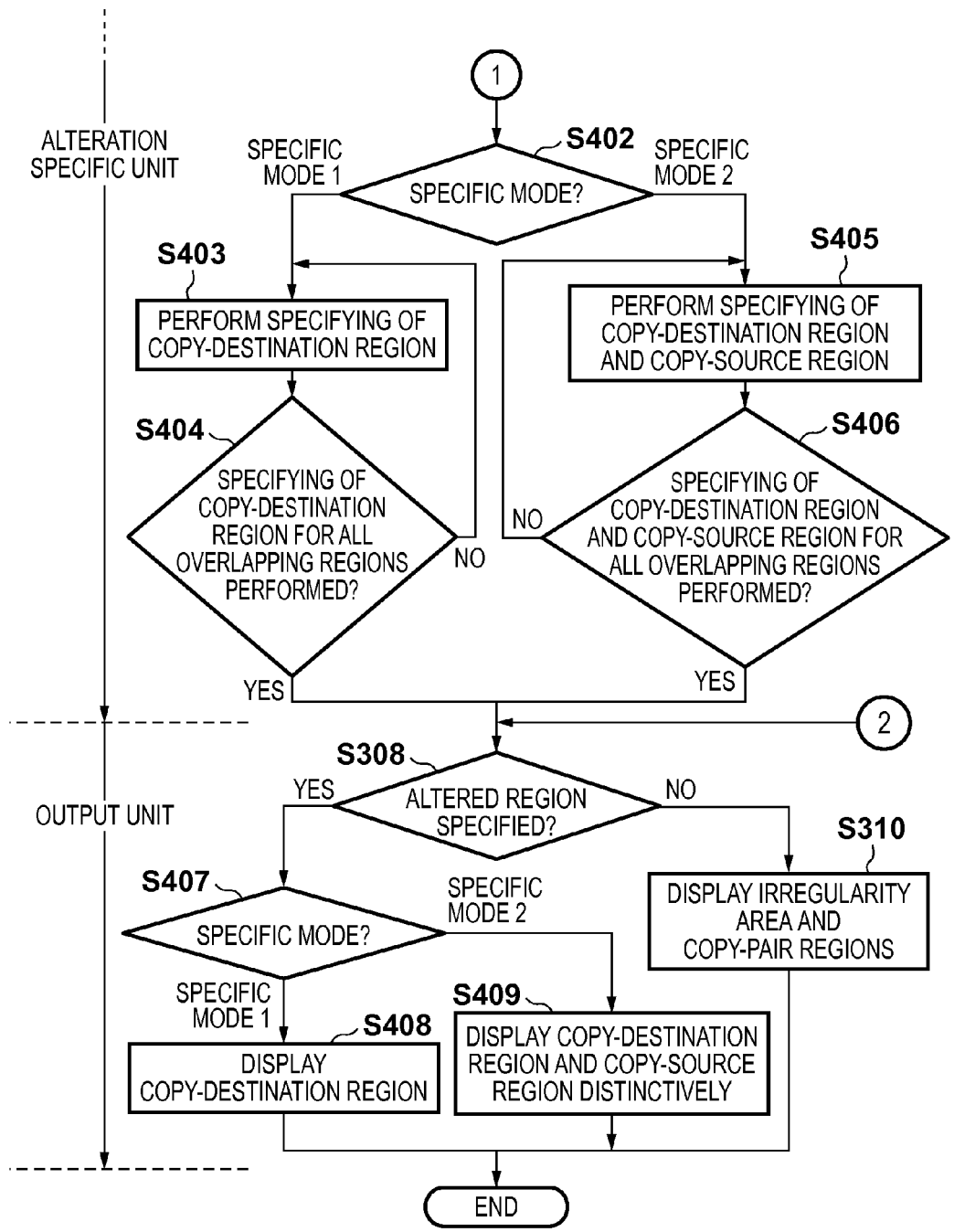

Alteration detection processing in the first modification will be described with reference to the flowcharts of FIGS. 10A and 10B. In FIGS. 10A and 10B, the same reference numerals as those in FIG. 9 denote the same processes, and a detailed description thereof will not be repeated.

The mode setting unit 206 receives a user instruction representing a specific mode (S401). The specific mode includes "specific mode 1" in which only a copy-destination region is specified, and "specific mode 2" in which both a copy-destination region and copy-source region are specified. For example, the user selects or designates a specific mode by operating a user interface displayed on the monitor 110. For example, the user designates specific mode 1 when he wants to know only an altered region, and specific mode 2 when he wants to know even the copy source of the altered region.

Then, processes in steps S301 to S305 are executed, and if an overlapping region is extracted, the alteration specific unit 204 determines the specific mode (S402). If specific mode 1 is designated, the alteration specific unit 204 performs specifying of copy-destination region (S403). The alteration specific unit 204 repeats the processing in step S403 until it is determined in step S404 that the specifying of copy-destination region for all overlapping regions have been performed.

If specific mode 2 is designated, the alteration specific unit 204 performs specifying of copy-destination region and copy-source region (S405). The alteration specific unit 204 repeats the processing in step S405 until it is determined in step S406 that the specifying of copy-destination region and copy-source region for all overlapping regions have been performed.

Then, the output unit 205 determines whether an altered region has been specified (S308). If no altered region has been specified (also, if no overlapping region has been extracted), the output unit 205 displays an irregularity area and copy-pair regions by the above-described method (S310). If altered region has been specified, the output unit 205 determines a specific mode (S407). If specific mode 1 has been designated, the output unit 205 displays a copy-destination region (S408). If specific mode 2 has been designated, the output unit 205 distinctively displays a copy-destination region and copy-source region (S409).

Alternatively, the mode setting unit 206 may receive a user instruction representing a display mode instead of the specific mode, and set the output unit 205 in the display mode. In this form, the alteration specific unit 204 specifies a copy-destination region and copy-source region regardless of the display mode. Then, the output unit 205 determines the display mode in step S407. If display mode 1 has been designated, the output unit 205 displays the copy-destination region (S408). If display mode 2 has been designated, the output unit 205 distinctively displays the copy-destination region and copy-source region (S409).

Second Modification

In the above-described example, the approximate area detection unit 203 detects areas having coincident or approximate feature amounts from the entire input image data in order to detect copy-pair regions generated by internal copy.

If a detected irregularity area arises from internal copy, the irregularity area is highly likely to correspond to a copy-destination region and have a feature amount coincident with or approximate to the feature amount of a copy-source region. In other words, an irregularity area, for which another area having a coincident or approximate feature amount exists in the same image, can be specified as a copy-destination region generated by internal copy. The other area having a coincident or approximate feature amount can be specified as a copy-source region.

The approximate area detection unit 203 in the second modification sets a detected irregularity area in a search query for searching for a true altered region generated by internal copy. Then, the approximate area detection unit 203 searches for an area having a feature amount coincident with or approximate to that of the irregularity area. Since only irregularity areas are searched for an area having a coincident or approximate feature amount, instead of searching the entire input image data, the processing speed of the approximate area detection unit 203 can be increased.

An example of alteration detection in the second modification will be explained with reference to FIGS. 11A to 11H. Assume that FIG. 11A shows original image data, and FIG. 11B shows altered image data having a region 1401 obtained by copying the partial region 1301 by internal copy. Further, assume that the altered image data shown in FIG. 11B is input image data, and the irregularity area detection unit 202 detects a region 1402 hatched in FIG. 11C as an irregularity area.

As shown in FIG. 11D, the approximate area detection unit 203 defines the irregularity area 1402 as a search query, and searches respective feature-amount extraction areas 1403 of input image data for an area (to be referred to as a "feature-amount approximate area" hereinafter) having a feature amount coincident with or approximate to the feature amount of the search query 1402.

As shown in FIG. 11E, the alteration specific unit 204 specifies, as a copy-source region in internal copy, a feature-amount approximate area 1404 detected by the search by the approximate area detection unit 203. Also, the alteration specific unit 204 specifies the irregularity area 1402 serving as the search query as a copy-destination region generated by the internal copy.

Figure 12B:
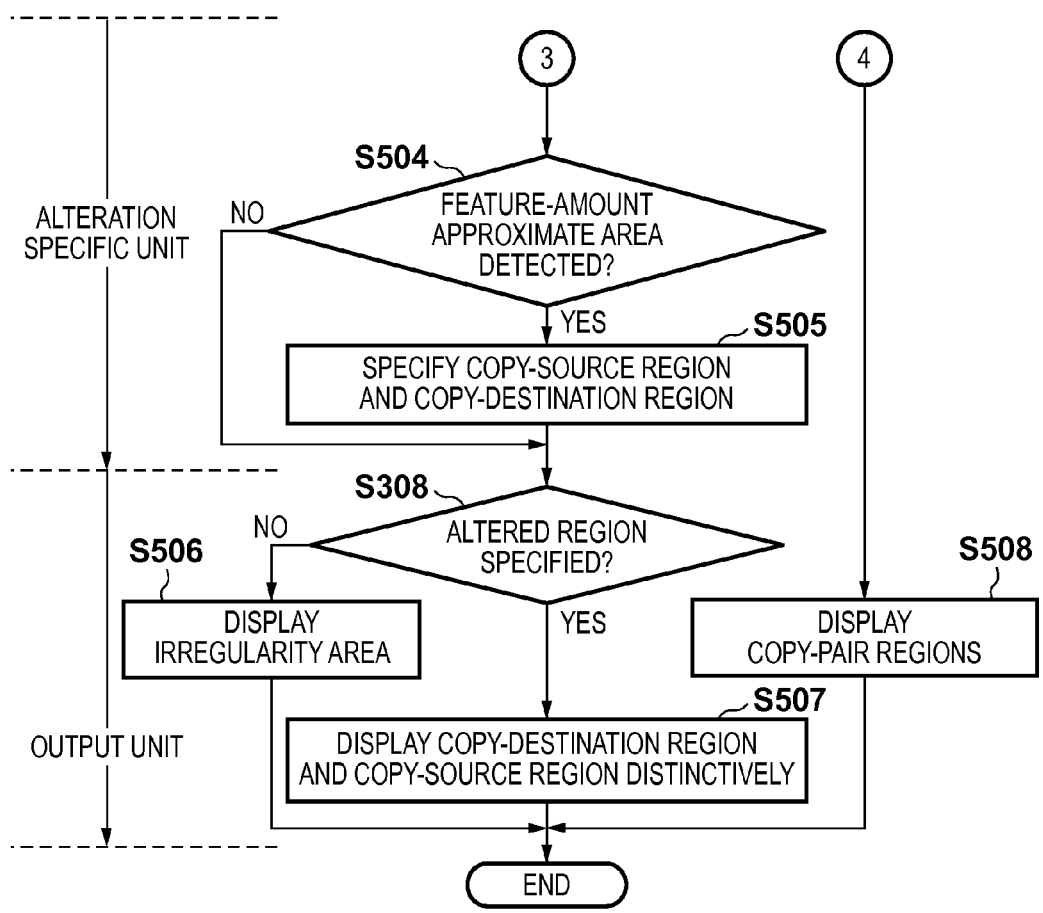

Alteration detection processing in the second modification will be explained with reference to the flowcharts of FIGS. 12A and 12B. In FIGS. 12A and 12B, the same reference numerals as those in FIG. 9 denote the same processes, and a detailed description thereof will not be repeated.

After the end of irregularity area detection (S302), the approximate area detection unit 203 determines whether an irregularity area has been detected (S501). If no irregularity area has been detected, the approximate area detection unit 203 performs detection of copy-pair regions (S303), and the output unit 205 displays them (S508).

If an irregularity area has been detected, the approximate area detection unit 203 searches for a feature-amount approximate area, as described above (S502). The approximate area detection unit 203 repeats the processing in step S502 until it is determined in step S503 that, for all irregularity areas, the searches for feature-amount approximate area have been performed.

Thereafter, the alteration specific unit 204 determines whether a feature-amount approximate area has been detected (S504). If no feature-amount approximate area has been detected, the process advances to step S308. If a feature-amount approximate area has been detected, the alteration specific unit 204 specifies a copy-source region and copy-destination region, as described above (S505).

The output unit 205 determines whether an altered region has been specified (S308). If no altered region has been specified, the output unit 205 displays the irregularity area (S506). If an altered region has been specified, the output unit 205 distinctively displays the copy-destination region and copy-source region (S507).

According to the second modification, the detection accuracy decreases, compared to a case in which an area having coincident or approximate feature amounts is detected from the entire input image data to detect copy-pair regions generated by internal copy. However, a copy-source region in internal copy and a copy-destination region generated by internal copy can be detected quickly.

Third Modification

The alteration detection processing in the second modification is expected to implement high-speed processing, but decreases the detection accuracy of a copy-destination region and copy-source region because a copy-source region is searched for by using, as a search query, an irregularity area for which the detection accuracy is low. For example, the detection result sometimes reveals only the rough positions of a copy-destination region and copy-source region, like the areas 1402 and 1404 shown in FIG. 11E.

In the third modification, an area having a coincident or approximate feature amount is additionally detected from the surrounding region in a detection result in the second modification, in order to improve the detection accuracy to such a degree as to clarify the detailed shapes of a copy-source region and copy-destination region. A copy-destination region serving as a detection result in the second modification will be called a "temporary copy-destination region", and a copy-source region will be called a "temporary copy-source region".

By the same processing as that in the second modification, the temporary copy-destination region 1402 and temporary copy-source region 1404 shown in FIG. 11E are detected. As shown in FIG. 11F, the approximate area detection unit 203 sets, as search regions, a surrounding region 1406 of the temporary copy-destination region 1402 and a surrounding region 1405 of the temporary copy-source region 1404. The surrounding regions 1405 and 1406 suffice to contain the temporary copy-source region 1404 and temporary copy-destination region 1402, respectively. For example, assume that the temporary copy-destination region 1402 is a square region of 100×100 pixels having upper left pixel coordinates of (100, 100) and lower right pixel coordinates of (200, 200). In this case, for example, a square region of 200×200 pixels having upper left pixel coordinates of (50, 50) and lower right pixel coordinates of (250, 250) is set as the surrounding region 1406.

As shown in FIG. 11G, the approximate area detection unit 203 searches feature-amount extraction areas 1407 of the surrounding region 1405 for an area having a feature amount coincident with or approximate to that of a feature-amount extraction area 1408 of the surrounding region 1406. If the approximate area detection unit 203 detects the feature-amount extraction area 1407 having a feature amount coincident with or approximate to that of the feature-amount extraction area 1408, the approximate area detection unit 203 adds the feature-amount extraction area 1408 to the copy-destination region and the feature-amount extraction area 1407 to the copy-source region.

The search and addition are executed for all the feature-amount extraction areas of the surrounding regions 1406 and 1405. The search and addition are performed using feature-amount extraction areas each smaller in area than an irregularity area detected by the irregularity area detection unit 202. This increases the detection accuracy to such a degree as to clarify the detailed shape of the region, like a copy-destination region 1409 and copy-source region 1410 shown in FIG. 11H.

Figure 13:
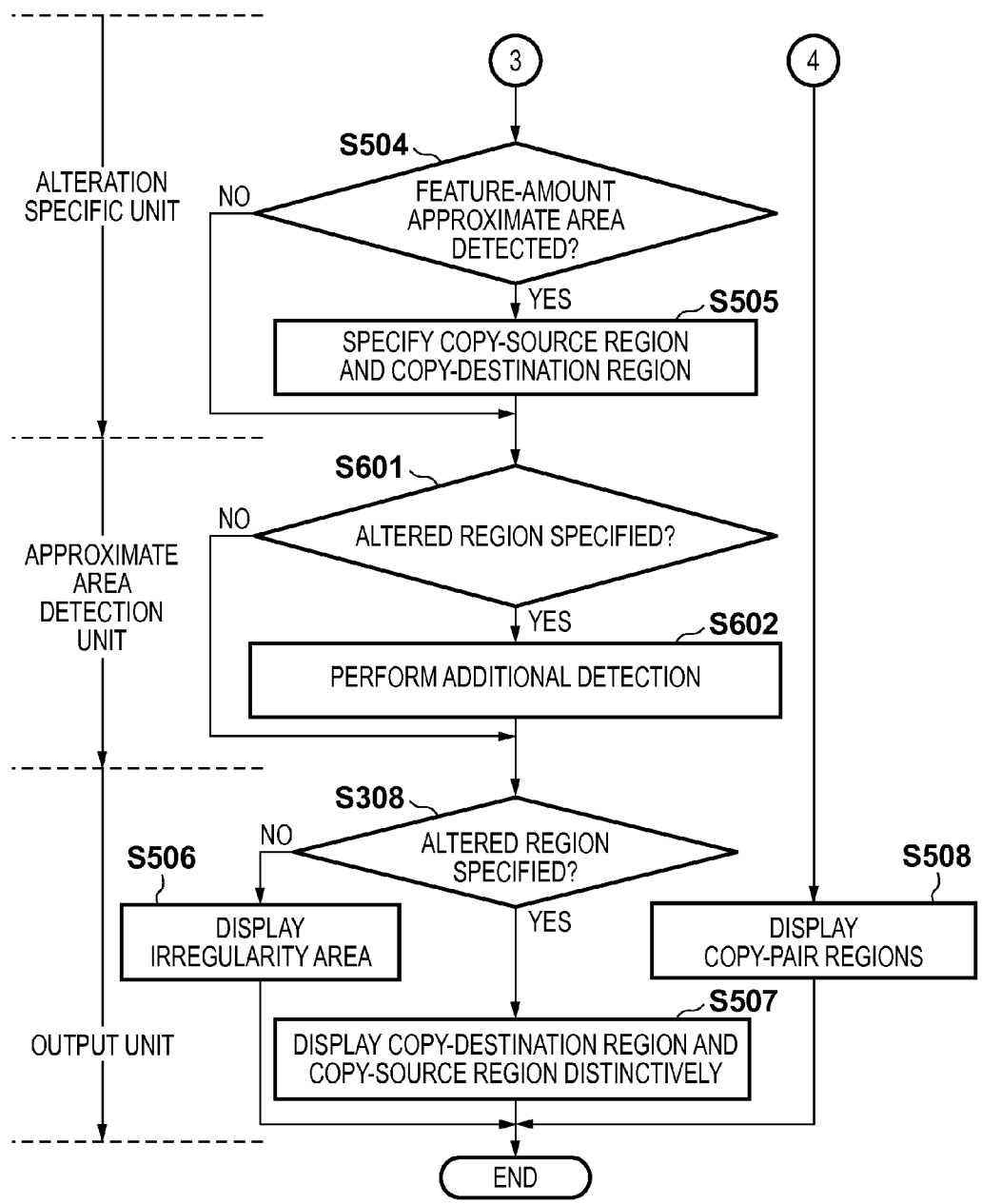
FIG. 13 is a flowchart for explaining alteration detection processing in the third modification.

Alteration detection processing in the third modification will be explained with reference to the flowchart of FIG. 13. Additional detection by the approximate area detection unit 203 is executed between steps S505 and S308 shown in FIG. 12B. In the third modification, the processes in steps S301 to S503 are the same as those in FIG. 12A. FIG. 13 shows processes in step S504 and subsequent steps. In FIG. 13, the same reference numerals as those in FIGS. 9 and 12B denote the same processes, and a detailed description thereof will not be repeated.

After the processes in steps S504 and S505, the approximate area detection unit 203 determines whether an altered region has been specified (S601). If an altered region has been specified, the approximate area detection unit 203 executes the above-described additional detection (S602). If no altered region has been specified, the process advances to step S308.

Figure 14:
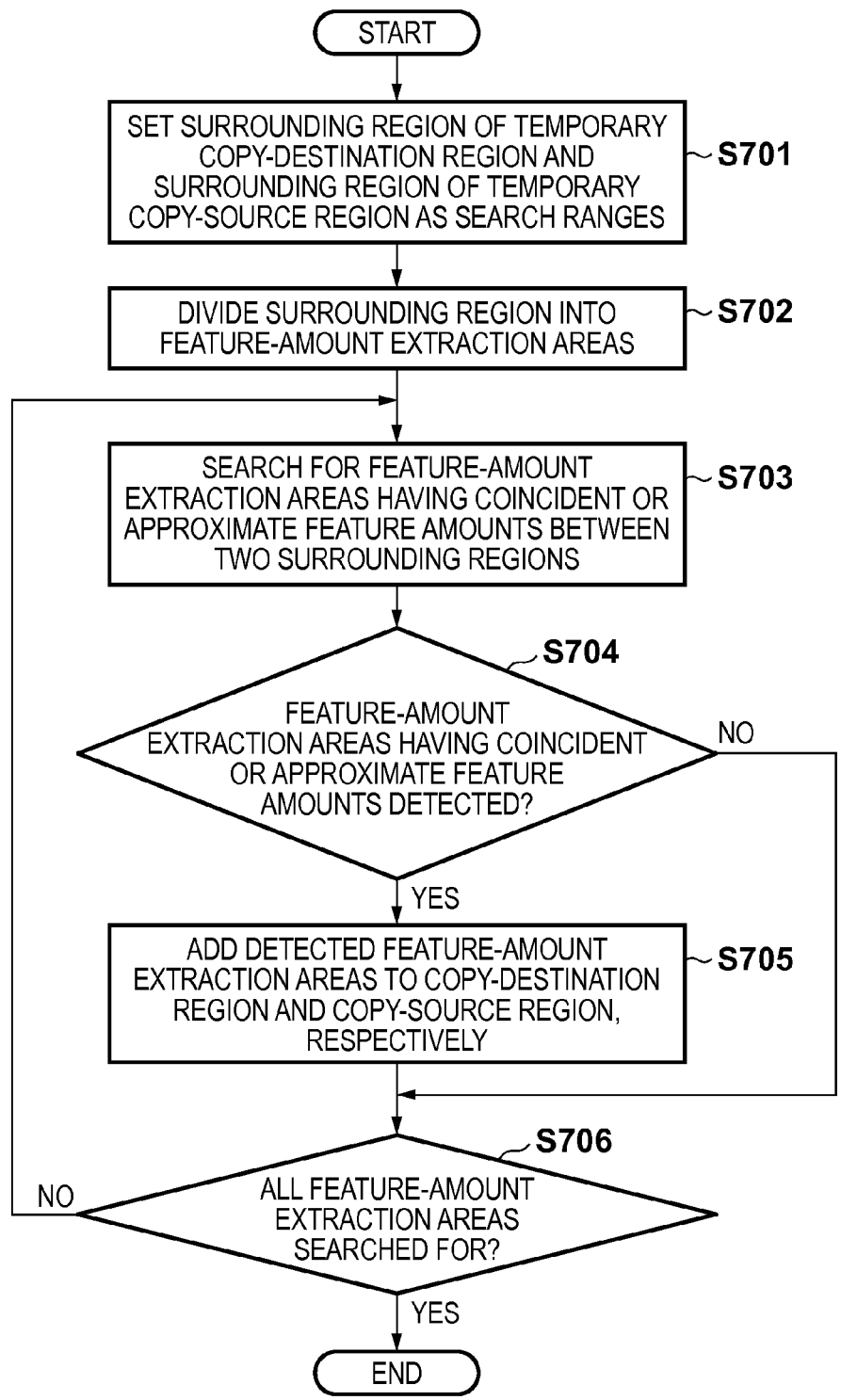
FIG. 14 is a flowchart for explaining details of additional detection.

Details of the additional detection will be explained with reference to the flowchart of FIG. 14.

The approximate area detection unit 203 sets, as search ranges, the surrounding region of the temporary copy-destination region and the surrounding region of the temporary copy-source region (S701). The approximate area detection unit 203 divides each surrounding region into feature-amount extraction areas (S702), and searches for feature-amount extraction areas having coincident or approximate feature amounts between the two surrounding regions (S703). If the approximate area detection unit 203 detects feature-amount extraction areas having coincident or approximate feature amounts (S704), it adds the detected feature-amount extraction areas to the copy-destination region and copy-source region, respectively (S705).

The approximate area detection unit 203 repeats the processes in steps S703 to S705 until it is determined in step S706 that all feature-amount extraction areas in the search ranges have been searched for.

The third modification can increase the speed of alteration detection processing in comparison with a case in which an area having coincident or approximate feature amounts is detected from the entire input image data to detect copy-pair regions generated by internal copy. In addition, the third modification can prevent a decrease in detection accuracy.

Fourth Modification

The second and third modifications have described an example in which, when a region altered by internal copy is not specified, an irregularity area is displayed. The fourth modification will explain an example in which an irregularity area not specified as a region altered by internal copy, out of detected irregularity areas, is specified as a region altered by external copy, in addition to a copy-destination region and copy-source region generated by internal copy.

Figure 15:
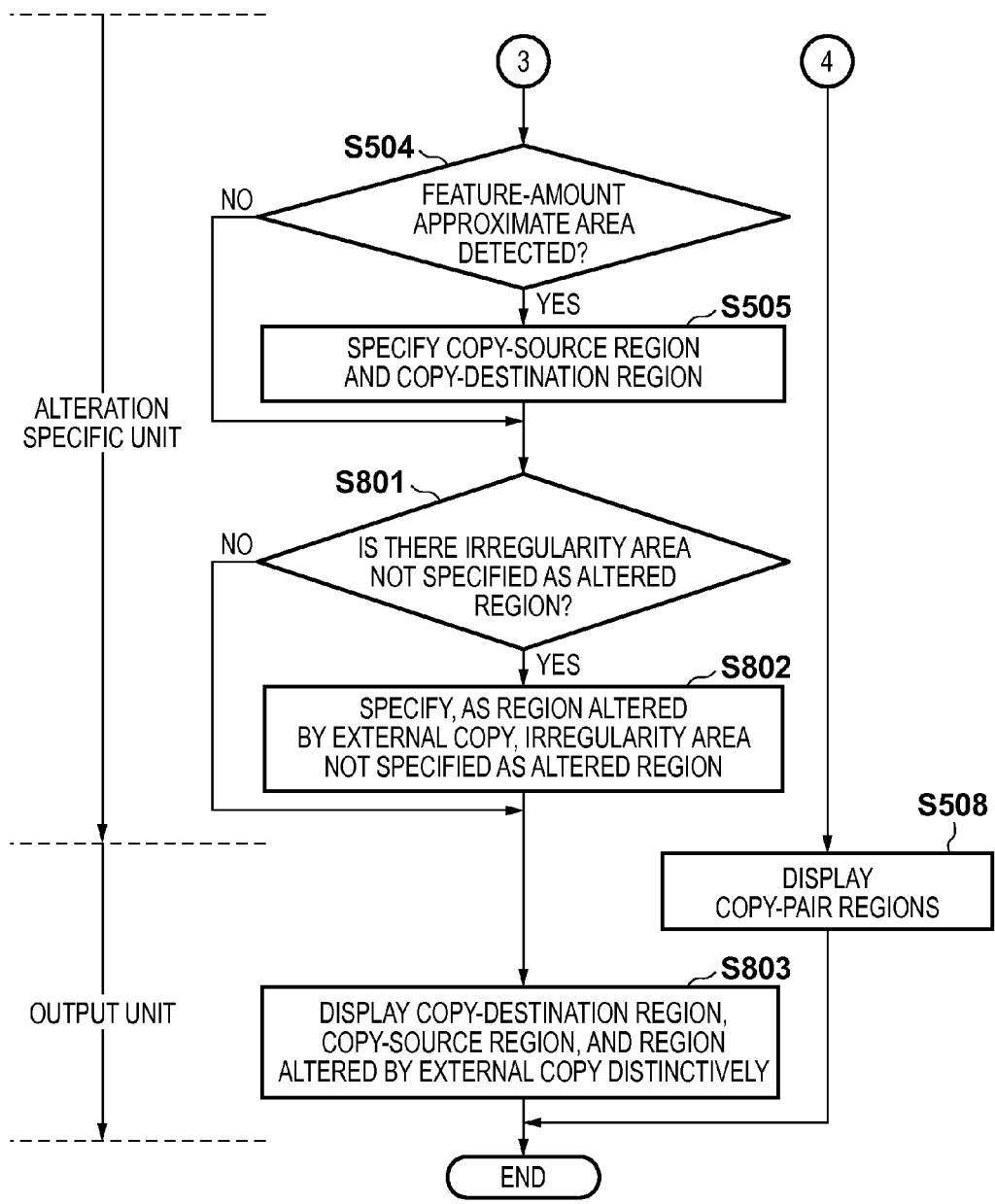
FIG. 15 is a flowchart for explaining alteration detection processing in the fourth modification.

Alteration detection processing in the fourth modification will be explained with reference to the flowchart of FIG. 15. Characteristic processing in the fourth modification is executed after step S505 shown in FIG. 12B. In the fourth modification, the processes in steps S301 to S503 are the same as those in FIG. 12A. FIG. 15 shows processes in step S504 and subsequent steps. In FIG. 15, the same reference numerals as those in FIG. 12B denote the same processes, and a detailed description thereof will not be repeated.

After the processes in steps S504 and S505, the alteration specific unit 204 determines whether there is an irregularity area not specified as an altered region (S801). The alteration specific unit 204 specifies, as a region altered by external copy, the irregularity area not specified as an altered region (S802). The output unit 205 distinctively displays a copy-source region, a copy-destination region, and the region altered by external copy (S803).

Other Modification

Switching of the specific mode/display mode described in the first modification is applicable to the alteration detection processing according to each of the second to fourth modifications.

Specification of a region altered by external copy, which has been described in the fourth embodiment, is applicable to each of the first embodiment, first modification, and third modification.

An example in which the feature amount is acquired by principal component analysis has been described, but feature amounts such as SIFT (Scale-Invariant Feature Transform) and SURF (Speeded Up Robust Feature) may be used. The approximate area detection unit 203 can also detect copy-pair regions generated by internal copy, based on whether not feature amounts but RGB component values coincide with or approximate to each other.

An example in which the CFA is used to detect an irregularity area has been described. However, the technique suffices to extract, from image data, an area where development processing in a camera is irregular. For example, a technique of extracting, from image data, noise (sensor noise) unique to an image sensor and detecting an irregularity area is also usable. It is also possible to estimate, from image data, a camera response function of performing edge processing in development, and specify, as an altered region, a region where the camera response function is irregular.

In other words, the irregularity area detection unit 202 estimates the development processing condition of input image data and detects, as an irregularity area, an area where the development processing condition is disturbed. As the development processing condition, the CFA pattern, the DMA, a reference pixel used for interpolation of a pixel of interest in demosaicing, sensor noise, the camera response function, or the like is available.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133097 filed Jun. 25, 2013 which is hereby incorporated by reference herein in its entirety.

What is claimed is:

1. An image processing apparatus comprising:
a first detection unit configured to detect, as an irregularity area, an area where development processing is irregular in imaging data based on a regularity of a color filter array (CFA) pattern;
a second detection unit configured to detect, as approximate areas, at least two areas having approximate feature amounts in the imaging data, wherein the approximate feature amounts of each of the approximate areas have a difference that is equal to or less than a predetermined threshold; and
a specifying unit configured to specify an altered region in the imaging data altered by regarding an overlapping region of the irregularity area and the approximate areas as the altered region,
wherein each of the first detection unit, the second detection unit, and the specifying unit is implemented using a processor.

2. The apparatus according to claim 1, wherein the second detection unit extracts the feature amount from the imaging data for each image area of a predetermined size.

3. The apparatus according to claim 1, wherein the specifying unit specifies one of the approximate areas not specified as the altered region as a copy-source region of the altered region.

4. The apparatus according to claim 3, further comprising an input unit configured to input a user instruction that designates an operation of the specifying unit,
wherein the specifying unit specifies the altered region or specifies each of the altered region and the copy-source region in accordance with the user instruction,
and the input unit is implemented using the processor.

5. An image processing apparatus comprising:
a first detection unit configured to detect, as an irregularity area, an area where development processing is irregular in imaging data based on a regularity of a color filter array (CFA) pattern;
a second detection unit configured to search the imaging data for a feature-amount approximate area having a feature amount approximate to a feature amount of the irregularity area for each image area of a predetermined size, wherein the approximate feature amount of the approximate area has a difference that is equal to or less than a predetermined threshold; and
a specifying unit configured to specify an altered region in the imaging data altered by regarding an overlapping region of the irregularity area and the approximate areas as the altered region,
wherein, in a case where the feature-amount approximate area is detected, the irregularity area is specified as an altered region in the imaging data, and the feature-amount approximate area is specified as a copy-source region of the altered region, and
each of the first detection unit, the second detection unit, and the specifying unit is implemented using a processor.

6. The apparatus according to claim 5, wherein the second detection unit sets surrounding regions around each of the altered region and the copy-source region, searches each image area for areas having approximate feature amounts between the two surrounding regions, and adds the areas having approximate feature amounts to the altered region and the copy-source region, respectively.

7. The apparatus according to claim 5, wherein the specifying unit specifies, as a region altered by an external copy, an irregularity area not specified as the altered region, out of a plurality of irregularity areas detected by the first detection unit.

8. The apparatus according to claim 1, further comprising an output unit configured to output information for distinctively displaying a region specified by the specifying unit,
wherein the output unit is implemented using the processor.

9. The apparatus according to claim 8, further comprising an input unit configured to input a user instruction which designates an operation of the output unit,
wherein the output unit outputs, in accordance with the user instruction, information for distinctively displaying the altered region, or information for distinctively displaying the altered region and the copy-source region, and
the input unit is implemented using the processor.

10. The apparatus according to claim 1, wherein the first detection unit estimates a development processing condition of the imaging data for each of the image areas of a size different from the size of the image area used for processing by the second detection unit, and detects, as the irregularity area, an area where the development processing condition is disturbed.

11. The apparatus according to claim 10, wherein the development processing condition comprises one of a color filter array pattern, a demosaicing algorithm, a reference pixel in interpolation of a pixel of interest in demosaicing, sensor noise, and a camera response function.

12. The apparatus according to claim 10, wherein the size of the image area used for processing by the second detection unit is smaller than the size of the image area used for processing by the first detection unit.

13. An image processing method comprising:
using a processor to perform the steps of:
detecting, as an irregularity area, an area where development processing is irregular in imaging data based on a regularity of a color filter array (CFA) pattern;
detecting, as approximate areas, at least two areas having approximate feature amounts in the imaging data, wherein the approximate feature amounts of each of the approximate areas have a difference that is equal to or less than a predetermined threshold; and
specifying an altered region in the imaging data altered by regarding an overlapping region of the irregularity area and the approximate areas as the altered region.

14. A non-transitory computer readable medium storing a computer-executable program for causing a computer to perform a method, comprising:
detecting, as an irregularity area, an area where development processing is irregular in imaging data based on a regularity of a color filter array (CFA) pattern;
detecting, as approximate areas, at least two areas having approximate feature amounts in the imaging data, wherein the approximate feature amounts of each of the approximate areas have a difference that is equal to or less than a predetermined threshold; and
specifying an altered region in the imaging data altered by regarding an overlapping region of the irregularity area and the approximate areas as the altered region.

15. An image processing method comprising:
using a processor to perform the steps of:
detecting, as an irregularity area, an area where development processing is irregular in imaging data based on a regularity of a color filter array (CFA) pattern;

searching the imaging data for a feature-amount approximate area having a feature amount approximate to a feature amount of the irregularity area for each image area of a predetermined size, wherein the approximate feature amount of the approximate area has a difference that is equal to or less than a predetermined threshold; and specifying an altered region and a copy-source region of the altered region in the imaging data based on the detection of the feature-amount approximate area, wherein, in a case where the feature-amount approximate area is detected, the irregularity area is specified as the altered region in the imaging data, and the feature-amount approximate area is specified as the copy-source region of the altered region.

16. A non-transitory computer readable medium storing a computer-executable program for causing a computer to perform a method, comprising:

detecting, as an irregularity area, an area where development processing is irregular in imaging data based on a regularity of a color filter array (CFA) pattern;

searching the imaging data for a feature-amount approximate area having a feature amount approximate to a feature amount of the irregularity area for each image area of a predetermined size, wherein the approximate feature amount of the approximate area has a difference that is equal to or less than a predetermined threshold; and specifying an altered region and a copy-source region of the altered region in the imaging data based on the detection of the feature-amount approximate area, wherein, in a case where the feature-amount approximate area is detected, the irregularity area is specified as the altered region in the imaging data, and the feature-amount approximate area is specified as the copy-source region of the altered region.

* * * * *